US012691311B2

(12) United States Patent
Bao et al.

(10) Patent No.: US 12,691,311 B2
(45) Date of Patent: Jul. 28, 2026

(54) FLAME ARRESTER

(71) Applicants: CHINA PETROLEUM & CHEMICAL CORPORATION, Beijing (CN); CHINA PETROLEUM & CHEMICAL CORPORATION QINGDAO RESEARCH INSTITUTE OF SAFETY ENGINEERING, Qingdao (CN)

(72) Inventors: Lei Bao, Qingdao (CN); Anfeng Yu, Qingdao (CN); Peng Wang, Qingdao (CN); Wenyi Dang, Qingdao (CN); Yongzhong Bai, Qingdao (CN); Chen Kuang, Qingdao (CN); Xiaodong Ling, Qingdao (CN); Guoxin Chen, Qingdao (CN); Houda Li, Qingdao (CN); Meng Gu, Qingdao (CN)

(73) Assignees: CHINA PETROLEUM & CHEMICAL CORPORATION, Beijing (CN); CHINA PETROLEUM & CHEMICAL CORPORATION QINGDAO RESEARCH INSTITUTE OF SAFETY ENGINEERING, Qingdao (CN)

( * ) Notice: Subject to any disclaimer, the term of this patent is extended or adjusted under 35 U.S.C. 154(b) by 496 days.

(21) Appl. No.: 18/002,136

(22) PCT Filed: Jan. 22, 2021

(86) PCT No.: PCT/CN2021/073197

§ 371 (c)(1),
(2) Date: Dec. 16, 2022

(87) PCT Pub. No.: WO2021/253828

PCT Pub. Date: Dec. 23, 2021

(65) Prior Publication Data

US 2023/0226393 A1 Jul. 20, 2023

(30) Foreign Application Priority Data

Jun. 18, 2020 (CN) ......................... 202010561387.3
Jun. 18, 2020 (CN) ......................... 202010562084.3

(51) Int. Cl.
*A62C 4/02* (2006.01)

(52) U.S. Cl.
CPC ..................................... *A62C 4/02* (2013.01)

(58) Field of Classification Search
CPC ................................... A62C 4/02; A62C 4/00
See application file for complete search history.

(56) References Cited

U.S. PATENT DOCUMENTS

| | | | | |
|---|---|---|---|---|
| 4,909,730 | A | 3/1990 | Roussakis et al. | |
| 11,724,138 | B2 * | 8/2023 | Hong | A62C 4/02 48/192 |
| 2003/0044740 | A1 | 3/2003 | Brooker | |

FOREIGN PATENT DOCUMENTS

| | | | |
|---|---|---|---|
| CN | 2056448 | U | 4/1990 |
| CN | 2147875 | Y | 12/1993 |

(Continued)

OTHER PUBLICATIONS

Zheng, Xuezhi et al.; "Industrial Flame Arrester"; Petroleum Industry Press, Mar. 1983; pp. 21-22.

(Continued)

*Primary Examiner* — Qingzhang Zhou
*Assistant Examiner* — Joel Zhou
(74) *Attorney, Agent, or Firm* — NKL Law; Allen Xue

(57) ABSTRACT

A flame arrester has a housing having an inlet and an outlet, and a flame retardant core arranged within the housing. Arranged within the flame arrester housing between the flame retardant core and the inlet is a flame arresting mechanism for preventing flames from directly impacting a central zone of the flame retardant core. The flame arresting (Continued)

mechanism may include a flame retardant barrel and a flame retardant plate assembly disposed within the flame arrester housing.

7 Claims, 8 Drawing Sheets

(56) References Cited

FOREIGN PATENT DOCUMENTS

| | | | |
|---|---|---|---|
| CN | 2207204 | Y | 9/1995 |
| CN | 2401210 | Y | 10/2000 |
| CN | 2401211 | Y | 10/2000 |
| CN | 101532727 | A | 9/2009 |
| CN | 201978377 | U | 9/2011 |
| CN | 102553108 | A | 7/2012 |
| CN | 103055452 | A | 4/2013 |
| CN | 104274929 | A | 1/2015 |
| CN | 204233647 | U | 4/2015 |
| CN | 204755030 | U | 11/2015 |
| CN | 106170320 | A | 11/2016 |
| CN | 109157780 | A | 1/2019 |
| CN | 110013627 | A | 7/2019 |
| CN | 209361708 | U | 9/2019 |
| CN | 210044733 | U | 2/2020 |
| CN | 210145351 | U | 3/2020 |
| CN | 210219330 | U | 3/2020 |
| CN | 210228944 | U | 4/2020 |
| CN | 111097118 | A | 5/2020 |
| CN | 210521588 | U | 5/2020 |
| DE | 4438797 | C1 | 3/1996 |
| GB | 2183020 | A | 5/1987 |
| GB | 2522476 | A | 7/2015 |
| JP | 2014201188 | A | 10/2014 |
| WO | 2019077377 | A1 | 4/2019 |

OTHER PUBLICATIONS

Shao, Guowei et al.; “Explosion-proofing of Process Equipment”; Chemical Industry Press, Jul. 1983; pp. 90.

* cited by examiner

FLAME ARRESTER

CROSS REFERENCE TO RELATED APPLICATIONS

This application is a U.S. national stage entry of PCT international application no. PCT/CN2021/073197, filed on Jan. 22, 2021, which claims the priorities of Chinese patent application No. 202010561387.3, entitled "Flame arrester with detonation-resistant unit" and filed on Jun. 18, 2020, and Chinese patent application No. 202010562084.3, entitled "Flame arrester including flame retardant plate" and filed on Jun. 18, 2020, the content of each is incorporated herein by reference in its entirety.

TECHNICAL FIELD

The present invention relates to the technical field of flame resistance and explosion suppression of pipelines, in particular to a flame arrester.

TECHNICAL BACKGROUND

Flame arrester is a safety device used to stop flame propagation of flammable gases and flammable liquid vapors. The flame arrester is generally installed in pipelines for delivery of flammable gases, in order to prevent the propagating flames from passing therethrough.

An existing flame arrester typically includes a generally cylindrical flame arrester housing, and a flame retardant core arranged in the flame arrester housing. The flame retardant core contains a large number of small passageways, so that the flame passing therethrough can be separated into a large number of minor flame beams. In this way, based on the heat transfer effect and wall effect, the flame arrester can reduce the temperature of the flame below the ignition point, or enable the combustion reaction cannot continue to proceed. Accordingly, the flame is prevented from propagating through the flame arrester.

However, deflagration or detonation often occurs in fires. As a result, flames propagating in pipelines often include deflagration or detonation flame. The existing flame arrester is not sufficiently effective in suppressing such deflagration or detonation flame. Even if the thickness of the flame retardant core is increased or the pore size of the flame retardant core is reduced, detonation and deflagration cannot be fully and effectively prevented.

SUMMARY OF THE INVENTION

In view of the above technical problems, the present invention aims to provide an improved flame arrester, which can effectively suppress deflagration or detonation flame.

According to the present invention, a flame arrester is provided, comprising a flame arrester housing having an inlet and an outlet, and a flame retardant core arranged in the flame arrester housing. The flame arrester housing is provided therein with a flame arresting mechanism located between the flame retardant core and the inlet, for preventing flame from directly impacting on a central zone of the flame retardant core.

In a preferred embodiment, the flame arresting mechanism comprises a flame retardant barrel with one end in communication with the inlet and another closed end, a passageway for medium flow being provided on a circumferential wall of the flame retardant barrel.

In a specific embodiment, the passageway is formed by a plurality of grids extending in an axial direction of the flame retardant barrel, the grids preferably having widths different from each other.

In a specific embodiment, the passageway is formed by a plurality of through holes arranged on the circumferential wall of the flame retardant barrel.

In a specific embodiment, the flame retardant barrel comprises a perforated portion or a meshed portion, perforations in the perforated portion or meshes of the meshed portion forming the passageway.

In a specific embodiment, the flame retardant barrel comprises a perforated portion and a meshed portion arranged adjacent to each other in an axial direction or a radial direction, perforations in the perforated portion or meshes of the meshed portion forming the passageway.

In a preferred embodiment, a total area of the passageway is twice larger than a cross-sectional area of a medium delivery pipeline connected to the flame arrester.

In a preferred embodiment, the flame retardant barrel is configured to have a gradually increasing volume in a direction toward the flame retardant core.

In a preferred embodiment, the flame arresting mechanism comprises two flame retardant barrels symmetrically arranged relative to the flame retardant core.

In a preferred embodiment, the flame arrester housing is formed as a cylinder, and connected to the inlet and the outlet respectively through a connecting portion on each side. The flame arrester housing has a transiting portion in a region adjacent to each connecting portion, and the flame arrester barrel is arranged in the transiting portion.

In a preferred embodiment, the flame arresting mechanism further comprises a flame retardant plate assembly arranged between the flame retardant barrel and the flame retardant core.

In a preferred embodiment, the flame retardant plate assembly comprises at least a first flame retardant plate and a second flame retardant plate axially spaced from each other, the first and second flame retardant plates being mounted on an inner wall of the flame arrester housing in a circumferentially staggered manner, but overlapped with each other in a central cross-sectional area of the flame arrester housing.

In a specific embodiment, the first and second flame retardant plates are each formed as a partially circular plate consisting of a superior arc segment and a straight segment. The superior arc segments of the first and second flame retardant plates are both mounted on the inner wall of the flame arrester housing, while the straight segments of the first and second flame retardant plates are parallel with each other and extend beyond a longitudinal centerline of the flame arrester housing.

In a specific embodiment, an angle formed between a cross section of the flame arrester housing and each of the first and second flame retardant plates is greater than or equal to 0 degrees and less than or equal to 45 degrees, preferably greater than or equal to 0 degrees and less than or equal to 25 degrees.

In a specific embodiment, through holes are formed in a region of each of the first and second flame retardant plates close to the inner wall of the flame arrester housing, an angle of preferably less than 90 degrees being formed between the through holes and the longitudinal centerline of the flame arrester housing.

In a specific embodiment, the flame arrester satisfies the following relationships: $1.5d \geq h1 \geq d$; $1.5d \geq h2 \geq d$; $D \geq 2d$; $h1 > 0.5D$; and $h2 > 0.5D$, wherein D is a diameter of a main body of the flame arrester housing, d is a diameter of the connecting portion, and h1 and h2 are lengths of the first and second flame retardant plates projecting on the cross section of the flame arrester housing, respectively.

In a preferred embodiment, the flame retardant plate assembly includes a central flame retardant plate disposed on an axial centerline of the flame arrester housing, and three peripheral flame retardant plates arranged in form of an equilateral triangle relative to the axial centerline, the central flame retardant plate and the peripheral flame retardant plates each being configured as an arc-shaped plate.

In a specific embodiment, the central and peripheral flame retardant plates are all bent along a medium flow direction, and the central flame retardant plate is located before the peripheral flame retardant plates in the medium flow direction. Alternatively, the central and peripheral flame retardant plates are all bent counter the medium flow direction, and the central flame retardant plate is located after the peripheral flame retardant plates in the medium flow direction.

In a specific embodiment, an area of a circumscribed circle of projections of the central and peripheral flame retardant plates on the flame retardant core is larger than a cross-sectional area of the connecting portion of the flame arrester housing, and a projection of the central flame retardant plate on the flame retardant core is at least partially overlapped with projections of the peripheral flame retardant plates on the flame retardant core.

In a specific embodiment, two flame retardant plate assemblies are arranged symmetrically with respect to the flame retardant core in the flame arrester housing.

According to the present invention, a flame arrester is further proposed, comprising: a flame arrester housing, having a substantially cylindrical main body, a connecting portion connected to each end of the main body, and a port connected to each connecting portion, wherein each end of the main body is connected with the connecting portion through a transiting portion; a flame retardant core arranged in the flame arrester housing; a flame retardant barrel arranged in the transiting portion of the main body, having a first end in communication with the port through the connecting portion, and a closed, second end facing the flame arresting core, wherein a passageway for medium flow is formed on a circumferential wall of the flame retardant barrel; and a flame retardant plate assembly arranged between the flame retardant barrel and the flame retardant core, comprising at least a first flame retardant plate and a second flame retardant plate axially spaced from each other, the first and second flame retardant plates being mounted on an inner wall of the flame arrester housing in a circumferentially staggered manner, but overlapped with each other in a central cross-sectional area of the flame arrester housing.

BRIEF DESCRIPTION OF THE DRAWINGS

In the following exemplary embodiments the present invention will be described in detail with reference to the accompanying drawings. In the drawings.

DETAILED DESCRIPTION OF EMBODIMENTS

The present invention will be further described below with reference to the accompanying drawings. In the context of the present invention, directional terms “upper”, “down”, “right”, “left”, “inner”, “outer” or the like refer to the “upper”, “down”, “right” and “left” directions in corresponding drawings, and the “inner”, “outer” directions of related components. In addition, the direction along the length of related components is indicated as “longitudinal direction” or “axial direction”, and the direction perpendicular to the “longitudinal direction” or “axial direction” is indicated as “radial direction”. Moreover, the terms “deflagration” and “detonation” can be generally used in an exchangeable manner, unless indicated otherwise.

Figure 1:
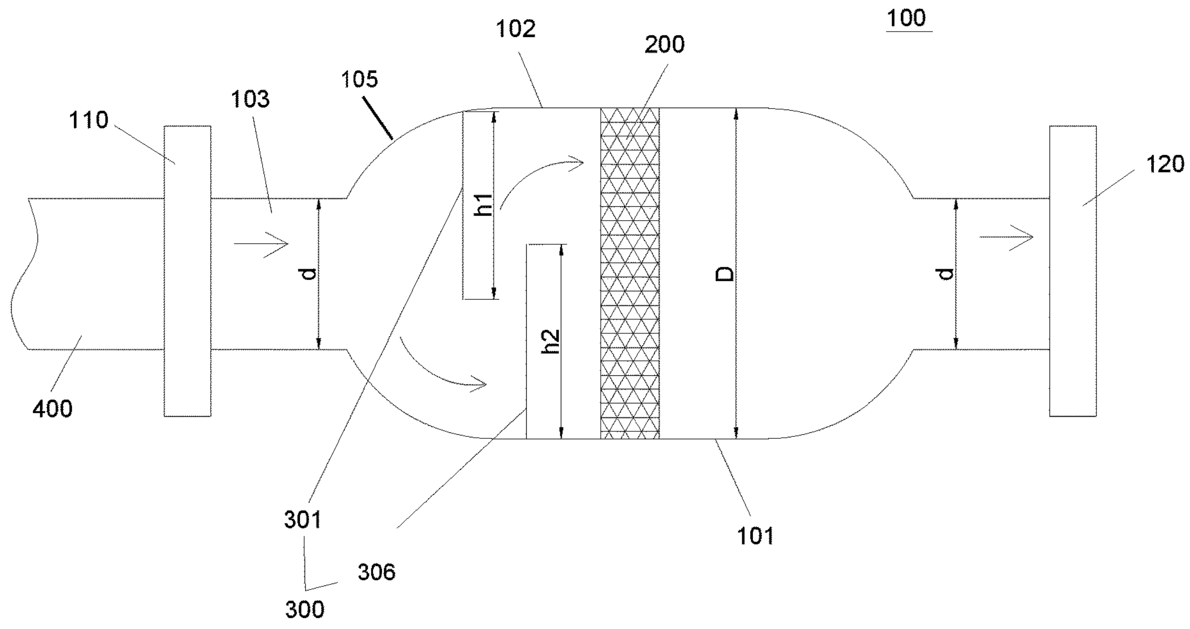
FIG. 1 shows an overall structure of a flame arrester according to a first embodiment of the present invention, wherein a flame retardant plate assembly is used.

FIG. 1 shows a flame arrester 100 according to a first embodiment of the present invention. As shown in FIG. 1, the flame arrester 100 according to the first embodiment of the present invention includes a flame arrester housing 101, and a flame retardant core 200 arranged in the flame arrester housing 101. The flame arrester housing 101 is substantially cylindrical, and includes a main body 102, and two connecting portions 103 respectively disposed on both sides of the main body 102.

The two connecting portions 103 respectively have an inlet 110 and an outlet 120, both of which are connected to a medium delivery pipeline 400. (FIG. 1 only shows that the inlet 110 is connected to the medium delivery pipeline 400.)

Generally speaking, the main body 102 and the connecting portions 103 are generally cylindrical, and have a diameter D and a diameter d, respectively, wherein D>d. In practice, D is usually 2-4 times of d, especially about 2 times. In addition, the main body 102 is usually connected with each connecting portion 103 through a transiting portion 105, and the flame retardant core 200 is generally located at an axial center position of the flame arrester housing 101.

The flame retardant core 200 may adopt various structures, for example, in a form of corrugated plate, wire mesh, sintered metal filler, metal foam, metal shot, filling material or the like. It should note that, depending on type of gas medium, requirements on the unit feature size of the flame retardant core 200 are different. At the same time, the flame retardant core 200 per se should include a structure with a certain supporting capacity, so as to prevent the flame retardant core 200 from being damaged when it is impacted by deflagration or detonation. The design of the flame retardant core 200 is well known to one skilled in the art, and will not be repeated here.

The inventors of the present application has surprisingly found through a large number of tests that when deflagration or detonation occurs in a pipeline, an area of flame retardant core located at the center of the pipeline is impacted by the deflagration or detonation flame to the maximum degree, and an explosion-facing zone expands in all radial directions gradually. Based on this inventive discovery, the inventors of the present application have improved the traditional flame arrester, adding a flame arresting mechanism therein for preventing the deflagration or detonation flame from impacting the central zone of the flame arrester.

According to a first embodiment of the present invention, in the main body 102 of the flame arrester housing 101, a flame retardant plate assembly 300 is provided between the inlet 110 and the flame retardant core 200. The flame retardant plate assembly 300 is configured to prevent the deflagration or detonation flame from the medium delivery pipeline 400 from directly impacting on the central zone of the flame retardant core 200. Specifically, in the embodiment shown in FIG. 1, the flame retardant plate assembly 300 includes a first flame retardant plate 301 and a second flame retardant plate 306. The first and second flame retardant plates 301, 306 are arranged in tandem along a longitudinal axis of the flame arrester housing 101, and spaced from each other by a certain distance. Meanwhile, the first and second flame retardant plates 301, 306 are arranged diametrically opposite to each other in a circumferential direction of the main body 102 of the flame arrester housing 101, with their radially outer sides being connected with an inner surface of the main body 102 and their radially inner sides being overlapped with each other at least partially in the central zone of the flame arrester housing 101.

With this structure, a meandering flow passageway for the flame to pass through is formed in the flame arrester housing 101, as shown by the arrows in FIG. 1. Therefore, when entering the flame arrester 100 from the inlet 110, the deflagration or detonation flame from the medium delivery pipeline 400 will change its direction of propagation, as indicated by the arrows in FIG. 1, under the blocking and guiding actions of the first and second flame retardant plates 301, 306 of the flame retardant plate assembly 300, thereby reducing the speed of propagation. Then, the flame passes through the flame retardant core 200, where the flame is extinguished. Finally, the medium flows out from the outlet 120.

As can be seen from the above, according to the present invention, by arranging the flame retardant plate assembly 300 between the flame retardant core 200 and the inlet 110 in the flame arrester housing 101, the deflagration or detonation flame can be diverted to reduce the impact of the deflagration or detonation flame on the central zone of the flame retardant core 200, and also reduce the propagation speed of the deflagration or detonation flame, thereby effectively achieving the purpose of resistance of deflagration or detonation. At the same time, the structure is compact and lightweight, easy to manufacture, and low cost.

On the other hand, according to the flame arrester 100 of the first embodiment of the present invention, the first and second flame retardant plates 301, 306 of the flame retardant plate assembly 300 are arranged in the main body 102 of the flame arrester housing 101 and spaced apart from each other, so that the medium can still flow through the flame arrester housing 101 smoothly. Therefore, compared with the flame arresters having traditional structures, the flame arrester 100 according to the first embodiment of the present invention can not only effectively prevent detonation or deflagration, but also have high efficiency in medium flowability.

In addition, according to the flame arrester 100 of the first embodiment of the present invention, the impact of the deflagration or detonation flame on the central zone of the flame retardant core 200 is decreased, so that the deflagration or detonation flame will impact more on a peripheral zone of the flame retardant core 200. In this way, on the one hand, the flame retardant effect can be effectively improved since the peripheral zone has large area and strong capability of heat absorption. On the other hand, the impact resistance of the flame retardant core 200 can be improved since the peripheral zone is supported better. Accordingly, the service life and flame-resistant performance of the flame retardant core 200 in the flame arrester 100 according to the first embodiment of the present invention are also significantly improved.

Figure 2:
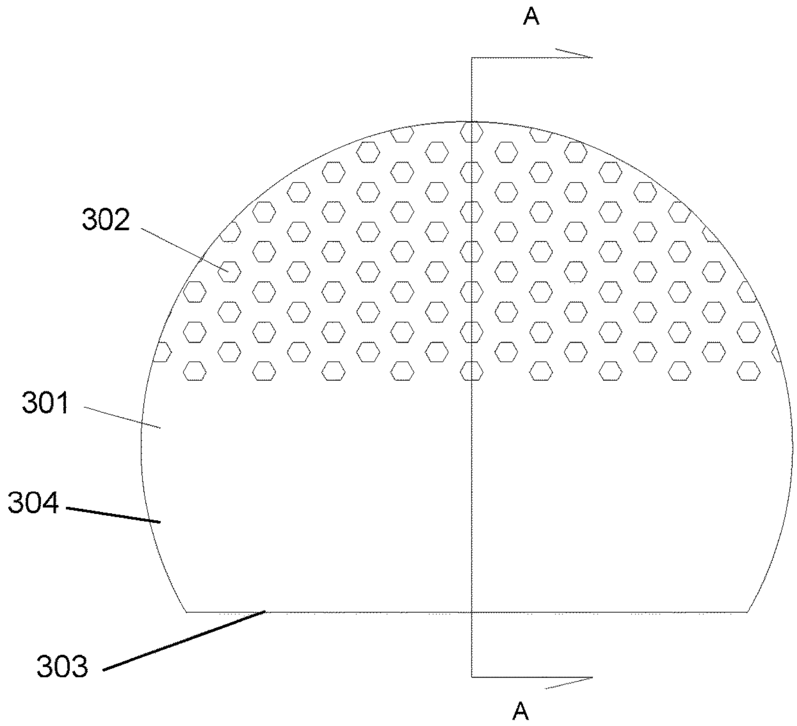
FIG. 2 is a schematic plan view of a flame retardant plate having a flat surface of the flame arrester as shown in FIG. 1, showing a distribution of through holes on the flame retardant plate.

The specific structure of the flame retardant plate used in the flame arrester 100 according to the first embodiment of the present invention will be described below with the first flame retardant plate 301 as an example. FIG. 2 is a schematic plan view of the first flame retardant plate 301. As shown in FIG. 2, the first flame retardant plate 301 is configured as a flat, circular plate having a diameter corresponding to an inner diameter of the main body 102 of the flame arrester housing 101, but with a part of the plate being cut away. That is, the cross-section of the first flame retardant plate 301 consists of a superior arc segment 304 and a straight segment 303. Therefore, the area of the first flame retardant plate 301 is larger than half of the cross-sectional area of the main body 102, but smaller than the whole cross-sectional area of the main body 102.

In addition, the flame retardant plate should be able to withstand the shock from detonation pressure. Usually, the flame retardant plate should have a deformation of less than 5% without structural damages, under a shock of 20 times higher than the design pressure of the flame arrester. Therefore, the thickness of the flame retardant plate should be selected based on different flame retardant medium and pressure. In this embodiment, the thickness of the first flame retardant plate 301 should be greater than or equal to 5 mm. When necessary, reinforcing rib (not shown) may also be appropriately provided on the first flame retardant plate 301. The reinforcing rib is usually made of stainless steel or carbon steel, and arranged on the flame retardant plate by welding, riveting or integral forming, so as to form the shape of a convex strip or rib on the surface of the flame retardant plate. The allowable pressure of the reinforcing rib should also be no less than 20 times of the design pressure of the flame arrester.

Figure 3:
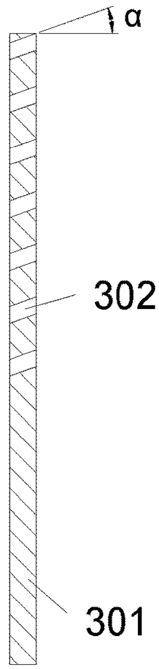
FIG. 3 is a sectional view along line A-A of FIG. 2.

In order to further facilitate the flowability of the medium while effectively prevent detonation and detonation, a plurality of separate through holes 302 are formed, as shown in FIG. 2, in a region of the first flame retardant plate 301 away from the straight segment 303 (that is, a region adjacent to the inner wall of the main body 102 of the flame arrester housing 101, i.e., an upper half region in FIG. 2), in order to improve the circulation efficiency of the flame arrester. In a preferred embodiment, as shown in FIG. 3, an angle α formed by a central line of each through hole 302 and the thickness direction of the first flame retardant plate 301 is less than or equal to 90°. That is, the through hole 302 may be formed as an inclined hole on the flat surface of the first flame retardant plate 301, so as to guide the flame away from the central zone of the flame retardant core.

Although not discussed in detail, it can be understood that the second flame retardant plate 306 has the same structure as the first flame retardant plate 301, but with a reversed orientation of installation.

With reference to FIG. 1, in order to meet the requirement that the flow drop is minimized on the premise of ensuring effective detonation resistance, the dimensions of the first flame retardant plate assembly 300 should meet the following requirements:

$1.5d \geq h1 \geq d$;

$1.5d \geq h2 \geq d$;

$D \geq 2d$;

$h1 \geq 0.5D$; and $h2 > 0.5D$;

wherein d is the diameter of the connecting portion 103, D is the diameter of the main body 102, and h1 and h2 are projected lengths of the first and second flame retardant plates 301, 306 on the cross-sectional direction of the flame arrester housing 101, respectively. Since in this embodiment the first and second flame retardant plates 301, 306 are both flat panels, h1 is the length of the first flame retardant plate 301, that is, the farthest distance from the straight segment 303 of the first flame retardant plate 301 to any point on the periphery of the first flame retardant plate 301. And h2 is defined similarly.

The distance between the first flame retardant plate 301 and the second flame retardant plate 306 can be selected according to the actual size of the main body 102. In general, the distance between the first flame retardant plate 301 and the second flame retardant plate 306 should be less than or equal to 0.5h1 or 0.5h2. At the same time, the distance between the flame retardant plate closest to the flame retardant core 200 (that is, the second flame retardant plate 306) and the flame retardant core 200 should also be less than or equal to 0.5h1 or 0.5h2.

The working procedure of the flame arrester 100 according to the present embodiment will be described below with reference to FIGS. 1 to 3. Under normal working condition, gas from the medium delivery pipeline 400 enters the flame arrester 100 from the inlet 110, passes through the flame retardant core 200 after flowing the connecting portion 103 and the flame retardant plate assembly 300 along the arrows in FIG. 1, and finally enters into a medium delivery pipeline (not shown) at the outlet side via the outlet 120.

Under flame arresting condition, the detonation flame from the medium delivery pipeline 400 enters the flame arrester housing 101 of the flame arrester 100 via the inlet 110 and the connection section 103. In the flame arrester housing 101, a central portion of the detonation flame will flow along the arrows in FIG. 1 under the action of the first and second flame retardant plates 301, 306 of the flame retardant plate assembly 300 which are staggered circumferentially, thus causing no direct impact on the central zone of the flame retardant core 200. At the same time, the peripheral portion of the detonation flame will directly pass through the through holes 302, which are formed on the first and second flame retardant plates 301, 306 and adjacent to the inner wall of the flame arrester housing 101, to the flame retardant core 200, so that no direct impact will be incurred on the central zone of the flame retardant core 200, either. In addition, since the central portion of the detonation flame proceeds along a meandering path, its propagation speed is significantly reduced due to the blocking action of the flat surfaces of the first and second flame retardant plates 301, 306. At the same time, the peripheral portion of the detonation flame passing through the through holes 302 also has a reduced velocity. On this basis, the destructive power of the detonation flame is further reduced by the flame retardant core 200, until it is extinguished.

Generally speaking, according to the type of flammable gas and the level of steam explosion, the flame arresters can be classified into:

a) flame arrester suitable for IIA1 gas (typically, methane);
b) flame arrester suitable for IIA gas (typically, propane);
c) flame arrester suitable for IIB1 gas (typically, ethylene);
d) flame arrester suitable for IIB2 gas (typically, ethylene);
e) flame arrester suitable for IIB3 gas (typically, ethylene);
f) flame arrester suitable for IIB gas (typically, hydrogen); and
g) flame arrester suitable for IIC class gas (typically, hydrogen).

The technical solutions of the present invention will be described in detail below through specific examples according to the explosion-resistant level.

Currently, test pressure of ethylene air is usually 1.1 bar, instantaneous pressure of detonation impact is greater than 70 bar, and the average pressure is about 13-16 bar. Different testing pipelines will have different pressures. For DN100 pipelines, the instantaneous pressure of detonation impact is greater than 72 bar, and the average pressure is 13.4 bar.

According to the structure proposed in the first embodiment of the present invention, a flame arrester F1 for the propagation of ethylene in air is provided. Specifically, the flame arrester F1 is suitable for DN100 pipelines, and has an overall length of 500 mm. The flame retardant core 200 is ethylene-resistant one, and comprises a flame retardant disc made of corrugated plates and a supporting member, the total thickness of the flame retardant core being 50 mm. The diameter of the connecting portion 103 of the flame arrester is 100 mm, the diameter of the main body 102 is 220 mm, and the wall thickness of the flame arrester housing 101 is 6 mm. The lengths h1 and h2 of the flame retardant plates 301, 306 are both 120 mm, the distance between the two flame retardant plates is 50 mm, and the distance between the flame retardant core 200 and the closer second flame retardant plate 306 is 50 mm. According to a large number of tests, the flame arrester F1 can withstand detonation impact of ethylene air at a pressure higher than normal, and successfully extinguish the flame. The test pressure of ethylene air is as high as 1.5 bar, the instantaneous pressure of detonation impact is above 121 bar, and the average pressure is 20.2 bar. Accordingly, the instantaneous pressure of detonation impact that can be withstood by the flame arrester F1 is increased by 72% above, and the average pressure is increased by 51%, whereby the flame can be extinguished successfully.

Also, according to the structure proposed in the first embodiment of the present invention, a flame arrester F2 for the propagation of hydrogen in air is provided. The only difference between the flame arrester F2 and the flame arrester F1 is that the flame retardant core 200 of the flame arrester F2 is replaced with one for hydrogen resistance. Currently, test pressure of hydrogen air is usually 1.1 bar, instantaneous pressure of detonation impact is up to 65.4 bar, and the average pressure is up to 8.2 bar. According to a large number of tests, the flame arrester F2 can withstand detonation impact of hydrogen air at a pressure higher than normal, and successfully extinguish the flame. The test pressure of hydrogen air is as high as 1.5 bar, the instantaneous pressure of detonation impact is above 95.6 bar, and the average pressure is 12.4 bar. Accordingly, the pressure resistance of the flame arrester F2 is increased by 51%.

Moreover, according to the structure proposed in the first embodiment of the present invention, a flame arrester F3 for the propagation of propane in air is provided. The only difference between the flame arrester F3 and the flame arrester F1 is that the flame retardant core 200 of the flame arrester F3 is replaced with one for propane resistance. Currently, test pressure of propane air is usually 1.1 bar, instantaneous pressure of detonation impact is above 87.6 bar, and the average pressure is up to 13.1 bar. According to a large number of tests, the flame arrester F3 can withstand detonation impact of propane air at a pressure higher than normal, and successfully extinguish the flame. The test pressure of propane air is as high as 1.6 bar, the instantaneous pressure of detonation impact is above 126.4 bar, and the average pressure is 21.3 bar. Accordingly, the pressure resistance of the flame arrester F3 is increased by 62% compared with traditional flame arresters.

In addition to ethylene and hydrogen, flammable gases usually include methane, propylene, mixed gases, or the like. For the traditional flame arresters, the average pressure of the detonation impact that can be withstood is in a range of 11 to 13 bar. However, for the flame arrester of this embodiment, the average pressure of the detonation impact that can be withstood is generally in a range of 16 to 20 bar, which indicates an improvement of about 40-60% compared with traditional flame arresters.

In addition, in the prior arts, the impact force of the flame entering the flame arrester on the flame retardant core is generally about 25% of the average pressure of the detonation impact. However, according to this embodiment, the impact force of the flame on the retardant core is about 17%-20% of the average pressure of the detonation impact, which indicates a decline of about 20-35% compared with the prior arts.

It can be seen from the detonation resistance procedure and test data of the above-mentioned specific examples that according to the flame arrester 100 provided by the first embodiment of the present invention, the deflagration or detonation flame entering the flame arrester from an external medium delivery pipeline cannot cause direct impact on the flame retardant core due to the existence of the flame retardant plate assembly. Therefore, the structural strength of the flame retardant core 200 used in the flame arrester 100 of the present invention can be designed in a more flexible way than the existing flame retardant cores, and the flame retardant core 200 can also have a large overall porosity, thereby improving the flowability and facilitating the cleaning thereof.

It should note that, based on the basic idea proposed by the first embodiment of the present invention, the specific structure of the above-mentioned flame arrester 100 can be further modified. For example, the flame retardant plate assembly may include three or more flame retardant plates spaced apart from one another.

Moreover, in addition to flat plate, the flame retardant plate can also be, e.g., curved plate, curved corrugated plate, inclined plate, or the like, as long as the structural stability thereof will not be affected. In a preferred embodiment, the flame retardant plate is an inclined plate. In this case, the angle $\alpha'$ formed between the extending direction of the flame retardant plate and the cross-sectional direction of the flame arrester housing should satisfy the following relationship: $0° \leq \alpha' \leq 45°$, preferably, $0° \leq \alpha' \leq 25°$.

Figure 4:
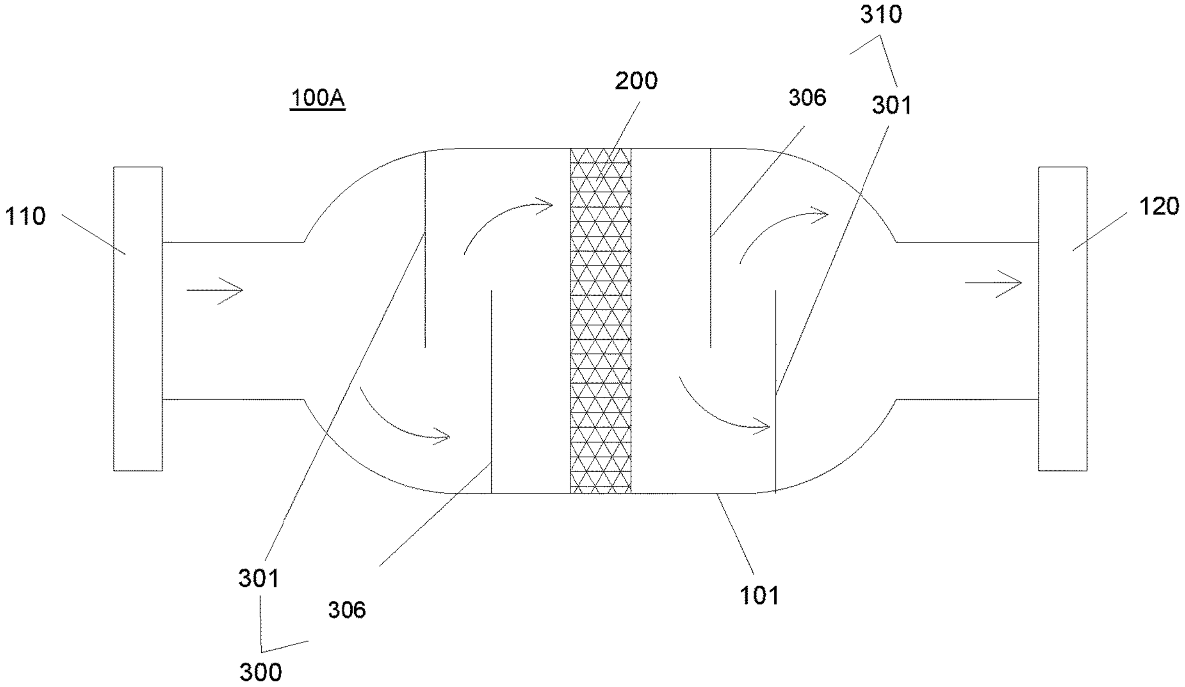
FIG. 4 shows an overall structure of a first variant of the flame arrester according to the first embodiment of the present invention.

FIG. 4 shows a flame arrester 100A of a first variant according to the first embodiment of the present invention. For the sake of conciseness and clarity, in FIG. 4 structures or components the same as those in FIGS. 1 to 3 are denoted by the same reference numbers, respectively, and the description thereof will not be repeated here. In addition, the technical effects associated with the flame arrester 100 are all applicable to the flame arrester 100A, and the description thereof will not be repeated here, either.

As shown in FIG. 4, the flame arrester 100A differs from the flame arrester 100 in that, in addition to the flame retardant plate assembly 300 provided between the inlet 110 of the flame arrester housing 101 and the flame retardant core 200, another flame retardant plate assembly 300 is arranged between the outlet of 120 of the flame arrester housing 101 and the flame retardant core 200. The two fire-resisting plate assemblies 300 have identical structures, and are arranged symmetrically with respect to the flame retardant core 200.

With two flame retardant plate assemblies 300 symmetrically arranged on both sides of the flame retardant core 200 in the flame arrester housing 101, the following technical effects can be achieved. On the one hand, no matter from which direction of the flame arrester 100 the deflagration or detonation flame comes (i.e., from the inlet 110 or from the outlet 120), the deflagration or detonation flame can be effectively prevented from impacting the central zone of the flame retardant core 200. On the other hand, taking the deflagration or detonation flame coming from the inlet 100 of the flame arrester 100 as an example, the remaining flame will, after passing through the flame retardant core 200 and thus having reduced destructive power as described in connection with FIG. 1, be further weakened by the flame retardant plate assembly 300 disposed between the outlet 120 of the flame arrester housing 101 and the flame retardant core 200, and thus is likely to be extinguished.

Figure 5:
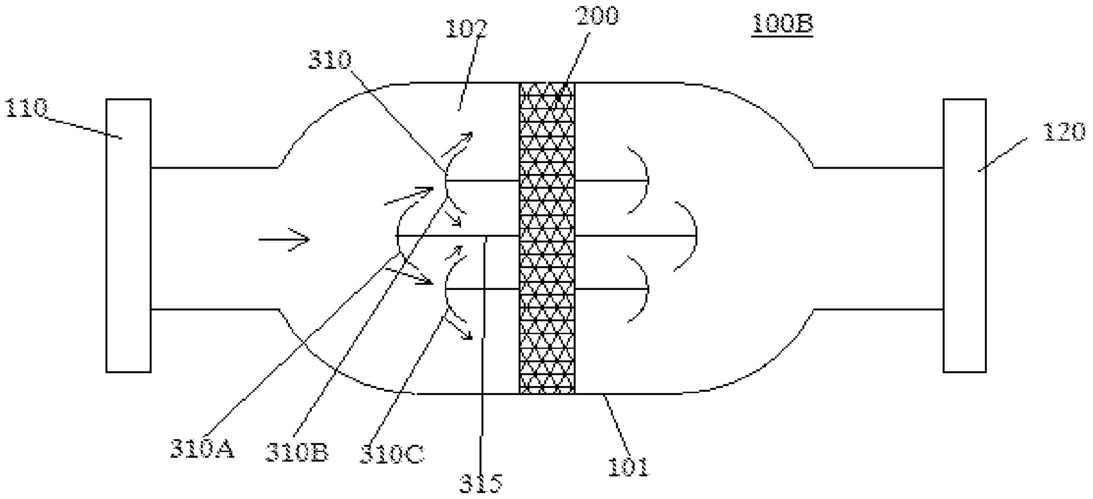
FIG. 5 shows an overall structure of a second variant of the flame arrester according to the first embodiment of the present invention.

FIG. 5 shows a flame arrester 100B of a second variant according to the first embodiment of the present invention. For the sake of conciseness and clarity, in FIG. 5 structures or components the same as those in FIGS. 1 to 3 are denoted by the same reference numbers, respectively, and the description thereof will not be repeated here. In addition, the technical effects associated with the flame arrester 100 are all applicable to the flame arrester 100B, and the description thereof will not be repeated here, either.

Figure 6:
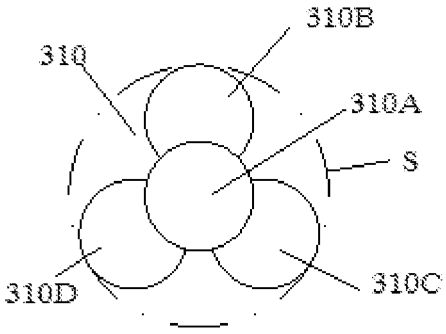
FIG. 6 schematically shows the arrangement and position relationship of four flame retardant plates in the flame arrester as shown in FIG. 5.

As shown in FIGS. 5 and 6, the flame arrester 100B differs from the flame arrester 100 in that the flame retardant plate assembly 310 consists of several arcuate plates. Specifically, in the flame arrester 100B, the flame retardant plate assembly 310 includes four flame retardant plates 310A to 310D mounted on a bracket 315 (shown schematically) fixedly connected to the flame retardant core 200. One of the flame retardant plates, i.e., the flame retardant plate 310A, is disposed on an axial centerline of the flame arrester housing 101 and closer to the inlet 110. Therefore, the flame retardant plate 310A is also referred to as a central flame retardant plate. The other three flame retardant plates 310B-310D are arranged in form of an equilateral triangle with respect to the axial centerline, and are located closer to the flame retardant core 200. Therefore, the flame retardant plates 310B-310D are also referred to as peripheral flame retardant plates. In this way, the four flame retardant plates 310A-310D form a triangular pyramid-like structure in the flame arrester 100B. As shown in FIG. 5, the arcuate shapes of the four flame retardant plates 310A-310D are all curved conforming to the flow direction of the medium (that is, the directions of the arrows in the drawing). In addition, as shown in FIG. 5, a flame retardant plate assembly 310 is disposed on each side of the flame retardant core 200, so that two assemblies 310 are arranged symmetrically with respect to the flame retardant core 200. However, it is understood that only one flame retardant plate assembly 310 arranged between the inlet 110 of the flame arrester housing 101 and the flame retardant core 200 is also feasible.

According to the present invention, the area of a circumscribed circle S of the projections of three peripheral flame retardant plates 310B-310D on the flame retardant core 200 should be larger than the cross-sectional area of the connecting portion 103 of the flame arrester 100B. In addition, the projection of the central flame retardant plate 310A on the flame retardant core 200 should be at least partially overlapped with each of the projections of the peripheral flame retardant plates 310B-310D on the flame retardant core 200. Moreover, the projecting area of the central flame retardant plate 310A on the flame retardant core 200 should be greater than half of the cross-sectional area of the connecting portion 103.

Through this arrangement, the plate surfaces of the four arcuate flame retardant plates can effectively shield the central zone of the flame retardant core 200, thus preventing the detonation flame from directly impacting thereon. At the same time, except part of the detonation flame reflected, the flame flowing to the flame retardant core 200 will flow along the arcuate surface of the flame retardant plates 301.

The working procedure of the flame arrester 100B of the second variant according to the first embodiment of the present invention will be described below. Under normal working condition, gas from the medium delivery pipeline enters the flame arrester 100B from the inlet 110, reaches the flame retardant core 200 through the connecting portion and the left flame retardant plate assembly 310 along the arrows in FIG. 5, and flows to the medium delivery pipeline at the outlet after passing through the flame retardant core 200, the right flame retardant plate assembly 310, and the outlet 120.

Under the flame arresting condition, the detonation flame from the medium delivery pipeline enters the flame arrester 100B from the inlet 110. In the flame arrester housing 101, the central part of the detonation flame will contact the central flame retardant plate 310A of the flame retardant plate assembly 310, changing its propagation direction at a reduced speed along the arcuate surface of the central flame retardant plate 310A, thereby encountering the three peripheral flame retardant plates 310B-310D of the flame retardant plate assembly 310. After that, the central part of the detonation flame will flow along the arcuate plate surfaces of the three peripheral flame retardant plates 310B-310D, finally reaching the flame retardant core 200 in a dispersed form. In this way, the direct impact of the detonation flame on the central zone of the flame retardant core 200 is significantly reduced. Moreover, the peripheral part of the detonation flame flows to the peripheral zone of the flame retardant core 200 under the guidance of the peripheral portions of the three peripheral flame retardant plates 310B-310D. Then, the detonation flame will, after passing through the flame retardant core 200, flow out via the right flame retardant plate assembly 310 and the outlet 120.

According to the structure proposed by the second variant of the first embodiment of the present invention, a flame arrester F4 for the propagation of ethylene in air is provided. Specifically, the flame arrester F4 is suitable for DN200 pipelines, and has an overall length of 700 mm. A flame retardant plate assembly 310 is provided on each side of the flame retardant core 200. The central flame retardant plate 310A of each flame retardant plate assembly 310 has a projecting diameter of 120 mm, and a plate surface of 60° radian, with a distance from the top of the plate surface to the flame retardant core 200 of 150 mm. The three peripheral flame retardant plates 310B-310D each have a projecting diameter of 90 mm, and a plate surface of 90° radian, with a distance from the top of the plate surface to the flame retardant core 200 of 120 mm. A circumscribed circle of the projections of the four flame retardant plates has a diameter of 220 mm. The bracket 315 is a high-strength screw with a cross-sectional diameter of 15 mm, having one end welded to the flame retardant plates while the other end connected to the flame retardant core via threads. The flame retardant core 200 comprises a flame retardant disc of corrugated plates, and supports, with a total thickness of 100 mm. More specifically, the diameter of the connecting portion of the flame arrester housing is 200 mm, and that of the main body is 430 mm.

In the prior arts, the test pressure of ethylene air is usually 1.1 bar, the instantaneous pressure of detonation impact is up to 98.3 bar, and the average pressure is up to 16.2 bar. By contrast, the flame arrester F4 can successfully pass a test for resistance of detonation flame of ethylene air, which has a testing pressure of 1.65 bar, an instantaneous pressure of the detonation impact up to 142.7 bar, and an average pressure up to 24.9 bar. This indicates the pressure capacity of the flame arrester F4 is 53% higher than that in the prior arts.

Figure 7:
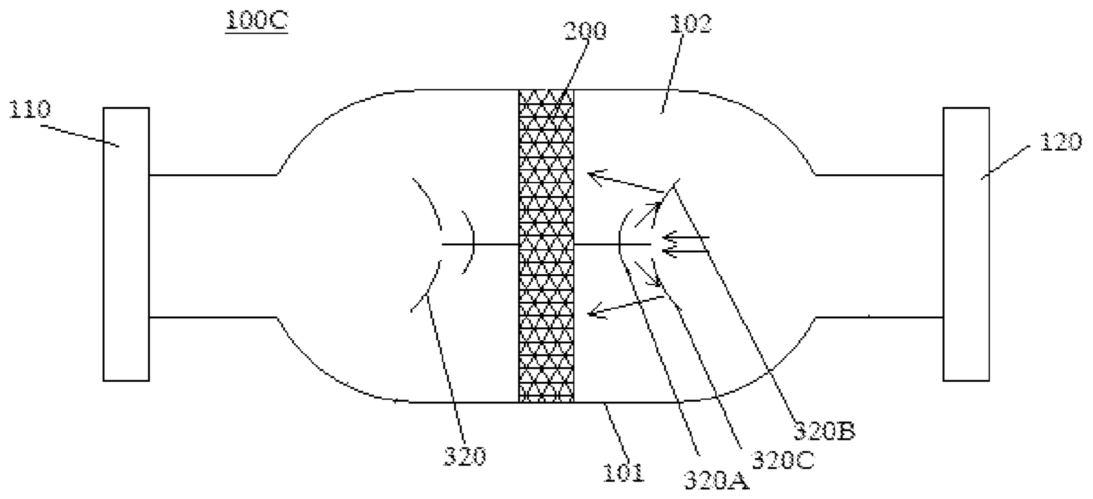
FIG. 7 shows an overall structure of a third variant of the flame arrester according to the first embodiment of the present invention.

FIG. 7 shows a flame arrester 100C of a third variant according to of the first embodiment of the present invention. For the sake of conciseness and clarity, in FIG. 7 structures or components the same as those in FIG. 5 are denoted by the same reference numbers, respectively, and the description thereof will not be repeated here. In addition, the technical effects associated with the flame arrester 100B are all applicable to the flame arrester 100C, and the description thereof will not be repeated here, either.

As shown in FIG. 7, the flame arrester 100C differs from the flame arrester 100B in that the arcuate flame retardant plates of the flame retardant plate assembly 320 are curved in opposite directions. That is, the arcuate shapes of all four flame retardant plates are curved opposite to the flow direction of the medium (that is, the directions of the arrows in the drawing). Thus, the central flame retardant plate 320A is disposed axially closer to the flame retardant core 200, while the three peripheral flame retardant plates 320B and 320C (the other one not shown in FIG. 7) are disposed axially further away from the flame retardant core 200. It should note that, for this variant of the flame arrester 100C shown in FIG. 7, the medium flows in from the outlet 120 and out from the inlet 110.

It is readily understood that with such a flame retardant plate assembly 320, the flame arrester 100C can achieve substantially the same technical effect as the flame arrester 100B.

According to the structure proposed in the third variant of the first embodiment of the present invention, a flame arrester F5 for propagation of propane in air is provided. Specifically, the flame arrester F5 is the same as the flame arrester F4, except that the flame retardant core 200 is replaced with one for resistance of propane.

In the prior arts, the test pressure of propane air is usually 1.1 bar, the instantaneous pressure of detonation impact is up to 92.1 bar, and the average pressure is up to 15.3 bar. By contrast, the flame arrester F5 can successfully pass a test for resistance of detonation flame of propane air, which has a testing pressure of 1.6 bar, an instantaneous pressure of the detonation impact up to 131.5 bar, and an average pressure up to 23.3 bar. This indicates the pressure capacity of the flame arrester F5 is 52% higher than that in the prior arts.

Figure 8:
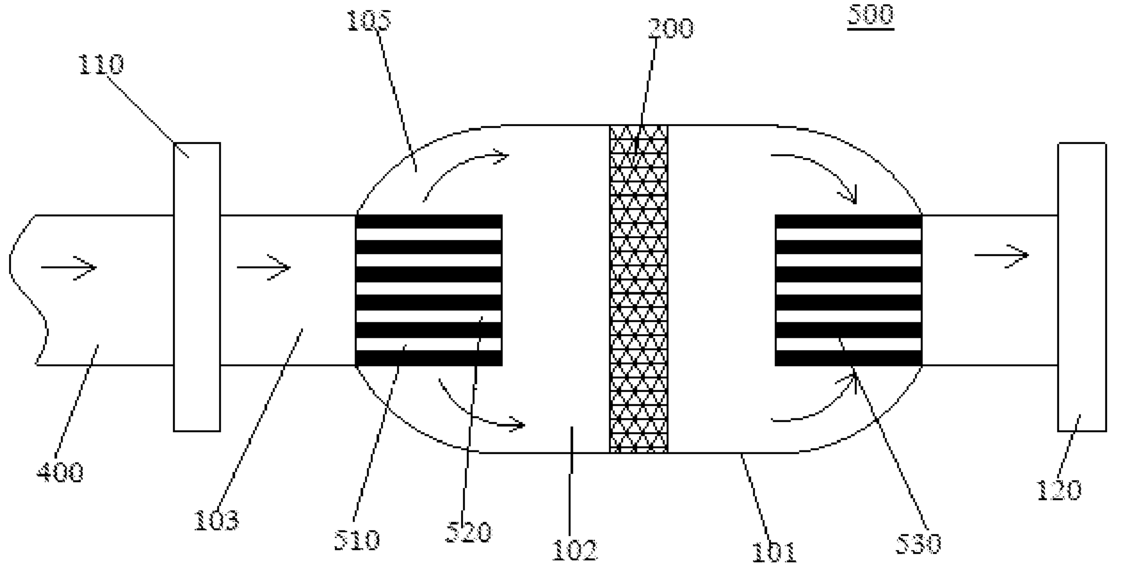
FIG. 8 shows an overall structure of a flame arrester according to a second embodiment of the present invention, wherein a flame retardant barrel is used.

FIG. 8 shows a flame arrester 500 according to a second embodiment of the present invention. For the sake of conciseness and clarity, in the present embodiment, structures or components the same as those in the first embodiment are denoted by the same reference numbers, respectively, and the description thereof will not be repeated here.

In the second embodiment according to the present invention, a flame retardant barrel 510 is used in the flame arrester 500, as a device capable of avoiding the impact of the deflagration or detonation flame on the central zone of the flame retardant core. Specifically, between the main body 102 and the connecting portion 103 of the flame arrester housing 101 a transiting portion 105 is provided, in which a flame retardant barrel 510 is arranged. The flame retardant barrel 510 is a hollow cylinder having one open end and one closed end, with the former connected to the connecting portion 103 while the latter facing the flame retardant core 200. Preferably, the diameter of the flame retardant barrel 510 is selected to be equal to that of the connecting portion 103, in order to facilitate the connection therebetween. A plurality of longitudinal grid passageways 520 are formed on the circumferential wall of the flame retardant barrel 510. In the embodiment shown in FIG. 8, the grid passageways 520 are configured as longitudinal slits.

In the embodiment shown in FIG. 8, two flame retardant barrels 510 and 530 are arranged in the flame arrester 500, symmetrically with respect to the flame retardant core 200. However, it can be understood that the arrangement including only one flame retardant barrel 510 also falls within the scope of the present invention.

In this way, under normal working condition, gas from the medium delivery pipeline 400 enters the flame arrester 500 through the inlet 110 and the connecting portion 103 along the direction of the arrow as shown in FIG. 8, and first enters the flame retardant barrel 510. Since the end of the flame retardant barrel 510 toward the flame retardant core 200 is a closed end, the gas will flow out through the grid passageways 520 of the flame retardant barrel 510 to the inner cavity of the flame arrester housing 101 along the direction of the arrows. Then, the gas passes through the flame retardant core 200, the flame retardant barrel 530 and the outlet 120 to enter the medium delivery pipe (not shown) on the other side.

In the flame arresting condition, the deflagration or detonation flame enters the flame arrester 500 from the medium delivery pipeline 400 through the inlet 110 and the connecting portion 103. Since the end of the flame retardant barrel 510 toward the flame retardant core 200 is a closed end, it can withstand the pressure impact from the detonation or deflagration flame. In this way, the gas flow and flame will pass through the plurality of grid passageways 520 to the inner cavity of the flame arrester housing 101. Under the above-mentioned action of the flame retardant barrel 510, the shear wave structure of detonation or deflagration is damaged, so that the propagation speed of the flame drops sharply. Meanwhile, when the flame enters the inner cavity of the flame arrester housing 101, the propagation speed of the flame is further reduced due to instantaneous volume expansion of the flame. In addition, since the end of the flame retardant barrel 510 toward the flame retardant core 200 is a closed end, the gas flow and flame have to pass through the grid passageways 520 in the radial direction to the peripheral area of the inner cavity of the flame arrester housing 101. Therefore, the impact of the flame on the central zone of the flame retardant core 200 is significantly reduced. After the medium passes through the flame retardant core 200 and further through the flame retardant barrel 530, the flame can be completely extinguished.

In particular, the inventors of the present invention have surprisingly found through experiments that the flame arrester 500 according to the second embodiment of the present invention is particularly suitable for detonation flames. Tests have proved that after passing through the flame retardant barrel 510 of the flame arrester 500, the speed of the detonation flame is rapidly reduced from an original speed of 1800 m/s to 400-500 m/s. That is, the detonation flame was changed to a deflagration flame. At the same time, it was also observed that the pressure attenuated from the original 12-16 bar to 2-3 bar, thus the impact on the flame retardant core was greatly reduced. In addition, it is readily understood that in the flame arrester 500 according to the second embodiment of the present invention, a plurality of grid passageways 520 are formed on the side wall of the flame retardant barrel 510, so that the medium can still flow through the flame arrester 500 smoothly. Therefore, compared with the flame arresters of traditional structures, the flame arrester 500 according to the second embodiment of the present invention can not only effectively prevent detonation or deflagration, but also have high efficiency of medium flowability.

According to the structure proposed in the second embodiment of the present invention, a flame arrester G1 for the propagation of ethylene in air is provided. The flame arrester G1 comprises two flame retardant barrels arranged therein, each having a grid width of 5 mm and a length of 100 mm. The flame arrester housing 101 has a wall thickness of 3 mm. In addition, the flame retardant core is a flame retardant disc of corrugated plates dedicated to deflagration resistance. When the flame arrester G1 is used, the flame retardant barrel can destroy the shear wave structure of the detonation, so as to transform the detonation flame into a deflagration one. After that, the deflagration flame is further weakened or even extinguished after passing through the flame retardant core.

According to the second embodiment of the present invention, a flame retardant barrel for detonation resistance and a flame retardant core for deflagration resistance are provided, so that flame resistance can be carried out in a targeted manner. Directing to characteristics of detonation, the flame retardant barrel as an anti-detonation unit can quickly transform the detonation into deflagration. Moreover, the flame retardant core as an anti-deflagration unit has better flowability as a whole than the counterparts of traditional detonation-resistant flame arresters, and presents a small pressure drop. At the same time, the thickness of the flame retardant core can be thinner, and the overall porosity thereof can be larger, thereby making it easier to clean.

Figure 9:
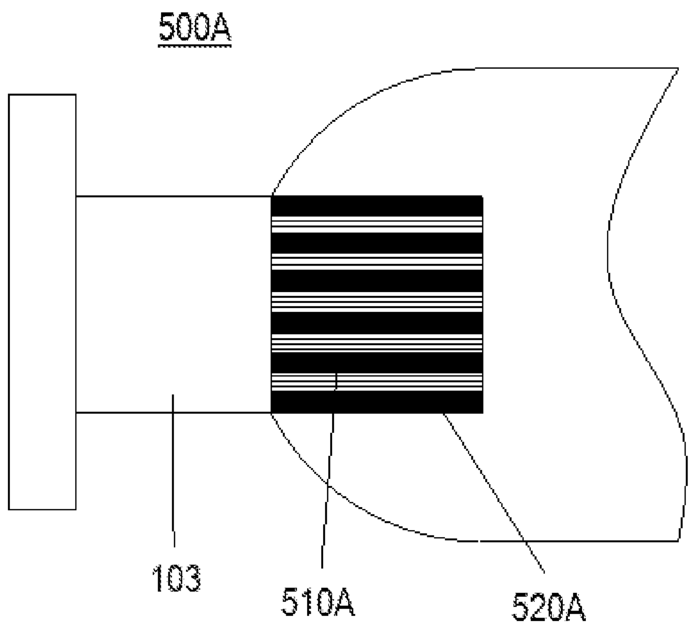
FIG. 9 shows an overall structure of a first variant of the flame arrester according to the second embodiment of the present invention.

FIG. 9 shows a flame arrester 500A according to a first variant of the second embodiment of the present invention. The flame arrester 500A differs from the flame arrester 500 only in the flame retardant barrel. Therefore, for the sake of conciseness and clarity, FIG. 9 only clearly shows the structure of the flame retardant barrel, but other components of the flame arrester 500A are not clearly shown. It is readily understood that the technical effects associated with the flame arrester 500 are all applicable to the flame arrester 500A, and the description thereof will not be repeated here.

As shown in FIG. 9, the flame retardant barrel 510A of the flame arrester 500A according to the first variant of the second embodiment of the present invention has a plurality of grid passageways 520A with different widths. The inventors of the present invention found through experiments that the width of the grid passageway 520A should not exceed half of the detonation shear wave structure S, preferably not exceed a quarter of the detonation shear wave structure S. When the width of the grid passageway 520A meets the above requirements, the flame retardant barrel 510A can effectively destroy the detonation shear wave structure, and thus significantly attenuate the detonation flame.

According to this variant of this embodiment of the present invention, the plurality of grid passageways 520A may have the same or different widths. At the same time, in order to strengthen the damage to the detonation shear wave structure, the grid passageway 310 may have shapes other than straight, such as zigzag, arc or the like. Moreover, in order to improve the structural strength of the flame retardant barrel, the grid passageway may have a discontinuous form consisting of multiple sections, in addition to a continuous form as shown in FIGS. 8 and 9. For example, in a preferred variant not shown, several grid passageways spaced from each other are provided at different axial positions on the circumferential wall of the flame retardant barrel.

Figure 10:
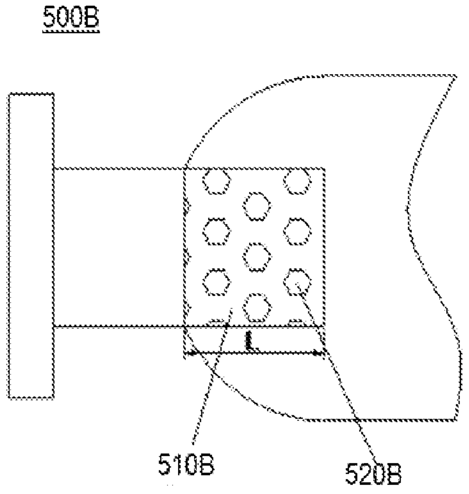
FIG. 10 shows an overall structure of a second variant of the flame arrester according to the second embodiment of the present invention.

FIG. 10 shows a flame arrester 500B according to a second variant of the second embodiment of the present invention. The flame arrester 500B differs from the flame arrester 500 only in the flame retardant barrel. Therefore, for the sake of conciseness and clarity, FIG. 10 only clearly shows the structure of the flame retardant barrel, but other components of the flame arrester 500B are not clearly shown. It is readily understood that the technical effects associated with the flame arrester 500 are all applicable to the flame arrester 500B, and the description thereof will not be repeated here.

As shown in FIG. 10, in this variant of the present embodiment, instead of a plurality of grid passageways formed in the flame retardant barrel 510B of the flame arrester 500B, a plurality of through holes 520B are formed on the wall of the flame retardant barrel 510B. That is, the flame retardant barrel 510B is configured as a perforated member. Accordingly, the deflagration or detonation flame can flow into the inner cavity of the flame arrester through the through holes 520B.

The inventors of the present invention found through experiments that when the total area of the through holes 520B in the flame retardant barrel 510B of the flame arrester 500B is twice larger than the cross-sectional area of the medium delivery pipeline connected to the flame arrester, a very effective anti-detonation effect can be achieved.

Figure 11:
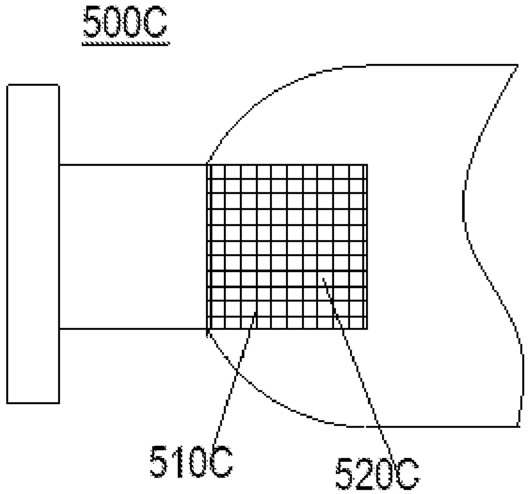
FIG. 11 shows an overall structure of a third variant of the flame arrester according to the second embodiment of the present invention.

FIG. 11 shows a flame arrester 500C according to a third variant of the second embodiment of the present invention. The flame arrester 500C differs from the flame arrester 500 only in the flame retardant barrel. Therefore, for the sake of conciseness and clarity, FIG. 11 only clearly shows the structure of the flame retardant barrel, but other components of the flame arrester 500C are not clearly shown. It is readily understood that the technical effects associated with the flame arrester 500 are all applicable to the flame arrester 500C, and the description thereof will not be repeated here.

As shown in FIG. 11, in this variant of the present embodiment, the circumferential wall of the flame retardant barrel 510C of the flame arrester 500C is formed with several meshes 520C. That is, the flame retardant barrel 510C is configured as a meshed member. Accordingly, the detonation or deflagration flame can enter the inner cavity of the flame arrester through the meshes 520C.

Similarly, the inventors of the present invention found through experiments that when the total area of the meshes 520C in the flame retardant barrel 510C of the flame arrester 500C is twice larger than the cross-sectional area of the medium delivery pipeline connected to the flame arrester, a very effective anti-detonation effect can be achieved.

Figure 12:
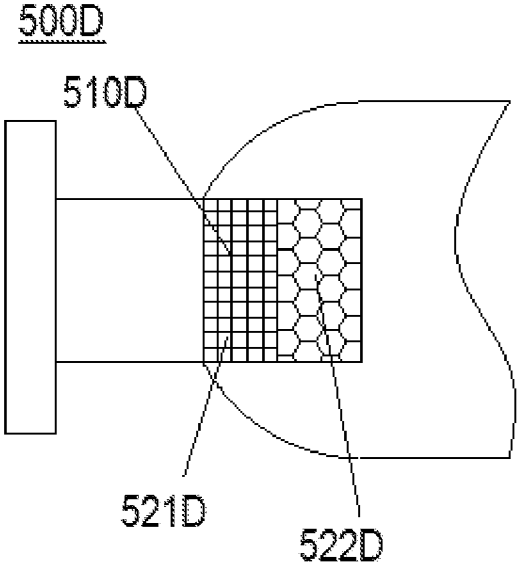
FIG. 12 shows an overall structure of a fourth variant of the flame arrester according to the second embodiment of the present invention.

FIG. 12 shows a flame arrester 500D according to a fourth variant of the second embodiment of the present invention. The flame arrester 500D differs from the flame arrester 500 only in the flame retardant barrel. Therefore, for the sake of conciseness and clarity, FIG. 12 only clearly shows the structure of the flame retardant barrel, but other components of the flame arrester 500D are not clearly shown. It is readily understood that the technical effects associated with the flame arrester 500 are all applicable to the flame arrester 500D, and the description thereof will not be repeated here.

As shown in FIG. 12, in this variant of the present embodiment, the circumferential wall of the flame retardant barrel 510D of the flame arrester 500D is configured as having a meshed portion 521D and a perforated portion 522D, which are arranged adjacent to each other in the axial direction. The meshed portion 521D includes several meshes, while the perforated portion 522D includes several through holes. Accordingly, the detonation or deflagration flame can enter the inner cavity of the flame arrester through the meshes and through holes.

Similarly, the inventors of the present invention found through experiments that when the total area of the meshes and the through holes in the flame retardant barrel 510D of the flame arrester 500D is twice larger than the cross-sectional area of the medium delivery pipeline connected to the flame arrester, a very effective anti-detonation effect can be achieved.

Although it is shown in FIG. 12 that the meshed portion 521D is arranged upstream of the perforated portion 522D with respect to the medium flow direction, it is understood that the meshed portion 521D may also be arranged downstream of the perforated portion 522D.

Figure 13:
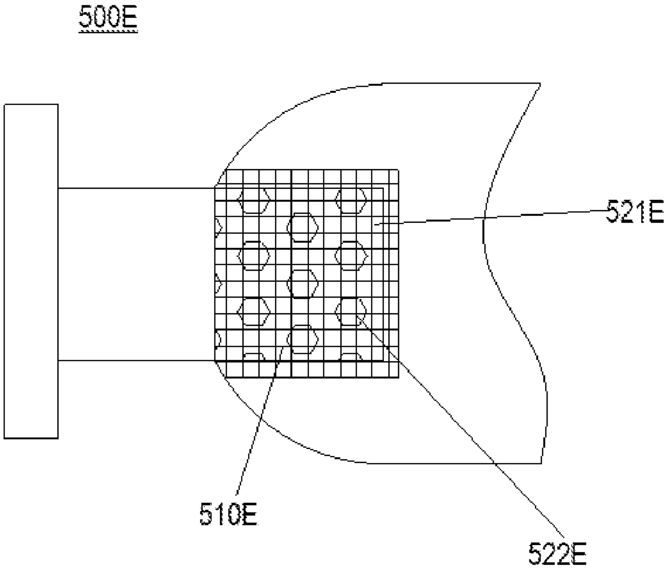
FIG. 13 shows an overall structure of a fifth variant of the flame arrester according to the second embodiment of the present invention.

FIG. 13 shows a flame arrester 500E according to a fifth variant of the second embodiment of the present invention. The flame arrester 500E differs from the flame arrester 500 only in the flame retardant barrel. Therefore, for the sake of conciseness and clarity, FIG. 13 only clearly shows the structure of the flame retardant barrel, but other components of the flame arrester 500E are not clearly shown. It is readily understood that the technical effects associated with the flame arrester 500 are all applicable to the flame arrester 500E, and the description thereof will not be repeated here.

As shown in FIG. 13, in this variant of the present embodiment, the circumferential wall of the flame retardant barrel 510E of the flame arrester 500E is configured as having a meshed portion 521E and a perforated portion 522E, which are arranged in sequence in the radial direction.

The meshes portion 521E includes several meshes, while the perforated portion 522E includes several through holes. Accordingly, the detonation or deflagration flame can enter the inner cavity of the flame arrester through the meshes and through holes.

Similarly, the inventors of the present invention found through experiments that when the total area of the meshes and the through holes in the flame retardant barrel 510E of the flame arrester 500E is twice larger than the cross-sectional area of the medium delivery pipeline connected to the flame arrester, a very effective anti-detonation effect can be achieved.

Although it is shown in FIG. 13 that the meshed portion 521E is arranged radially inner of the perforated portion 522E (i.e., the perforated portion 522E wraps around the meshed portion 521E), it is understood that the meshes portion 521E may also be arranged radially outer of the perforated portion 522E (i.e., the meshed portion 522E wraps around the perforated portion 521E).

Figure 14:
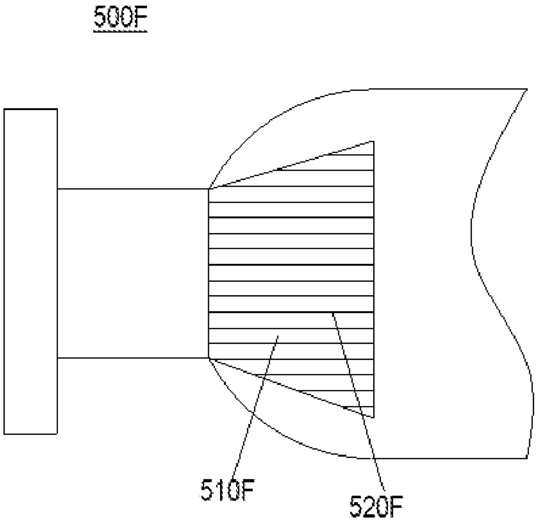
FIG. 14 shows an overall structure of a sixth variant of the flame arrester according to the second embodiment of the present invention.

FIG. 14 shows a flame arrester 500F according to a sixth variant of the second embodiment of the present invention. The flame arrester 500F differs from the flame arrester 500 only in the flame retardant barrel. Therefore, for the sake of conciseness and clarity, FIG. 14 only clearly shows the structure of the flame retardant barrel, but other components of the flame arrester 500F are not clearly shown. It is readily understood that the technical effects associated with the flame arrester 500 are all applicable to the flame arrester 500F, and the description thereof will not be repeated here.

As shown in FIG. 14, in this variant of the present embodiment, the flame retardant barrel 510F of the flame arrester 500F is configured as a cone rather than a cylinder. Specifically, the volume of the flame retardant barrel 510F gradually increases in the direction toward the flame retardant core (not shown) in the axial direction.

In this flame arrester 500F, since the flame arrester housing gradually increases in volume along the medium flow direction, the gas flow and the flame will pass through a plurality of grid passages 520F to enter the inner cavity of the flame arrester in a manner of expanding in volume. Under the above-mentioned action of the flame retardant barrel 510F, the detonation shear wave structure is damaged, and the flame propagation speed is further reduced due to the instantaneous expansion in the volume of the flame.

It is readily understood that, according to this variant of the second embodiment of the present invention, various structures of the flame arrester different from the cone can be conceived, as long as the volume of the flame arrester gradually increases along the medium flow direction.

Based on the innovative conception proposed by the second embodiment of the present invention, that is, the flame can be treated step by step so as to be weakened gradually, the present application further proposes a flame arrester of a novel structure.

Figure 15:
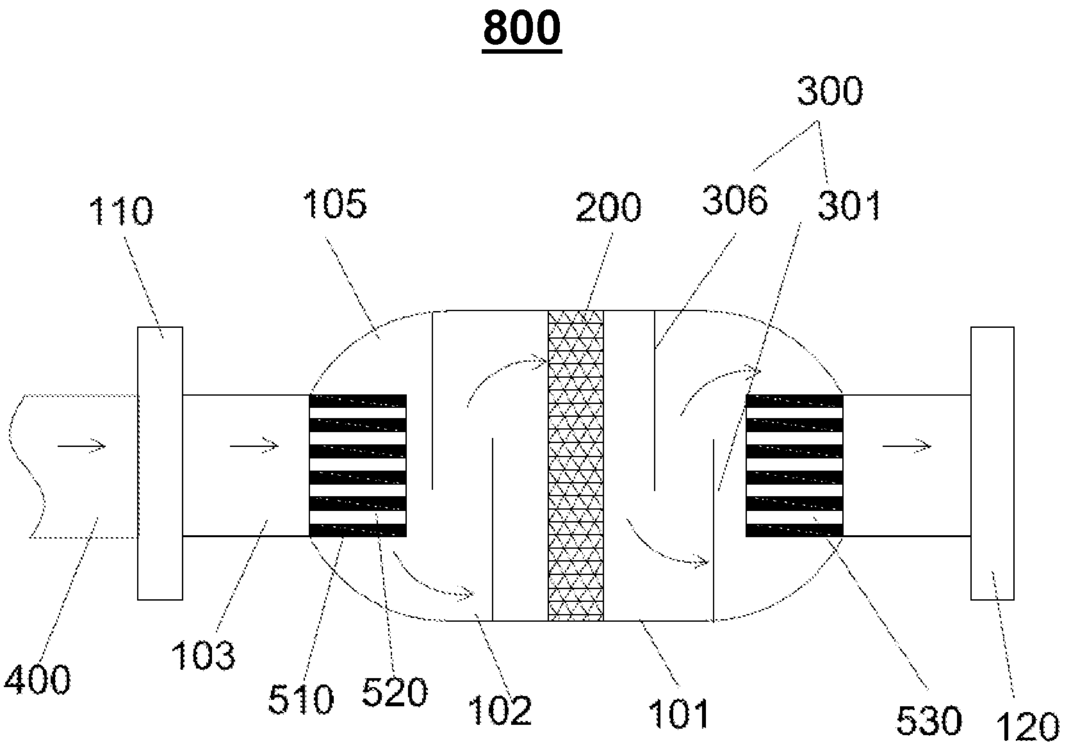
FIG. 15 shows an overall structure of a flame arrester according to a third embodiment of the present invention In the drawings, the same reference numbers are used to indicate the same components. The drawings are not drawn to actual scale.

FIG. 15 shows a flame arrester 800 according to a third embodiment of the present invention. As can be seen from FIG. 15, the flame arrester housing of the flame arrester 800 according to a third embodiment of the present invention is provided therein with a flame retardant barrel 510 according to the second embodiment of the present invention, and a flame retardant plate assembly 300 according to the first embodiment of the present invention.

In the flame arrester 800 according to the third embodiment of the present invention, the flame retardant barrel 510 functions to reduce the speed and pressure of the detonation flame from the medium delivery pipeline, and force the detonation flame away from the central zone of the flame arresting core 200, but rather enter the peripheral area of the flame arrester housing 101 along the radial direction of the flame retardant barrel 510. In this way, the detonation flame can be effectively transformed into a deflagration flame. Afterwards, the deflagration flame passes through the flame retardant plate assembly 300, which further reduces the speed of the flame, and forces the flame to impact more on the peripheral zone of the flame retardant core 200 rather than the central zone thereof. The flame then passes through the flame retardant core 200, and is further weakened. Tests prove that the flame arrester 800 according to the third embodiment of the present invention can extinguish the detonation flame well.

Therefore, according to the third embodiment of the present invention, the detonation flame is first introduced into the peripheral area of the flame arrester housing by the flame retardant barrel, and transformed into a deflagration flame. Then, the deflagration flame is further weakened by the flame retardant plate assembly, and finally extinguished through the flame retardant core. This embodiment is a combination of the first embodiment and the second embodiment, and creatively proposes to weaken the power of the detonation flame step by step, thereby achieving a particularly satisfactory flame resistance effect. Meanwhile, it is readily understood that the flame arrester according to the third embodiment of the present invention also has excellent efficiency of medium flowability.

It should note that although not discussed in detail, one skilled in the art can understand that in some variants of the third embodiment of the present invention not shown, any combination of the variants of the flame retardant plate assembly according to the first embodiment of the present invention and the variants of the flame retardant barrel according to the second embodiment of the present invention can be used, which can also achieve technical effects similar to the flame arrester 800.

While the present invention has been described above with reference to the exemplary embodiments, various modifications may be made and components may be replaced with equivalents thereof without departing from the scope of the present invention. In particular, as long as there is no structural conflict, the technical features mentioned in different embodiments can be combined with each other in any manner. The present invention is not limited to the specific embodiments disclosed herein, but includes all technical solutions falling within the scope of the claims.

The invention claimed is:

1. A flame arrester, comprising a flame arrester housing having an inlet and an outlet, and a flame retardant core arranged in the flame arrester housing, wherein the flame arrester housing is provided therein with a flame arresting mechanism located between the flame retardant core and the inlet for preventing flame from directly impacting on a central zone of the flame retardant core, the flame arrester housing comprises a main body, a first connecting portion connected to the inlet, and the second connecting portion connected to the outlet, with a central axis extending therethrough, wherein the flame arresting mechanism comprises a flame retardant plate assembly arranged between at least one of the first and the second connecting portions and the flame retardant core, wherein the flame retardant plate assembly comprises at least a first flame retardant plate and a second flame retardant plate mounted on an inner surface of the flame arrester housing, being spaced apart from each other in an axial direction and in a circumferential direction, and the central axis of the flame arrester housing extends through the first flame retardant plates-plate and the second flame retardant plate, wherein the first flame retardant plate and the second flame retardant plate are overlapped with each other in a central area of a cross section of the flame arrester housing that is perpendicular to the central axis, and wherein each of the first and the second flame retardant plates is a truncated circular flat plate bounded by a major arc segment and a straight segment, and the major arc segment for each of the first and the second flame retardant plates is affixed to the inner surface of the flame arrester housing, the straight segments of the first and the second flame retardant plates are parallel with each other.

2. The flame arrester according to claim 1, wherein an angle between the cross section of the flame arrester housing and each of the first and second flame retardant plates is greater than or equal to 0 degree and less than or equal to 45 degrees.

3. The flame arrester according to claim 1, wherein a portion of the first flame retardant plate adjacent to the inner surface of the flame arrester housing comprises a plurality of through holes and a remaining portion of the first flame retardant plate is free of through holes, and/or a portion of the second flame retardant plate adjacent to the inner surface of the flame arrester housing comprises a plurality of through holes and a remaining portion of the second flame retardant plate is free of through holes.

4. The flame arrester according to claim 1, wherein the flame arrester satisfies the following relationships: $1.5d \geq h1 \geq d$; $1.5d \geq h2 \geq d$; $D \geq 2d$; $h1 > 0.5D$; and $h2 > 0.5D$, wherein D is a diameter of a main body of the flame arrester housing, d is a diameter of the connecting portion, and h1 and h2 are maximum lengths of projections the first and the second flame retardant plates on a cross section of the flame arrester housing along the central axis thereof, respectively.

5. The flame arrester according to claim 1, comprising a first flame retardant plate and a second flame retardant plate assembly that are respectively disposed on a first side and a second side of the flame retardant core in the flame arrester housing.

6. The flame arrester according to claim 2, wherein the angle between the cross section of the flame arrester housing and each of the first and second flame retardant plates greater than or equal to 0 degree and less than or equal to 25 degrees.

7. The flame arrester according to claim 3, wherein an axial direction of one of the plurality of through holes and the central axis of the flame arrester housing are at an angel of less than 90 degrees.

* * * * *